United States Patent [19]
Araki et al.

[11] 3,912,832
[45] Oct. 14, 1975

[54] OXIDATION RESISTANT COATED CARBON ARTICLES

[75] Inventors: Tadashi Araki; Kiro Asano, both of Tokyo; Junichi Kosugi, Urawa, all of Japan

[73] Assignee: Toyo Boseki Kabushiki Kaisha, Osaka, Japan

[22] Filed: Mar. 15, 1973

[21] Appl. No.: 341,739

Related U.S. Application Data

[63] Continuation-in-part of Ser. No. 166,118, July 26, 1971, Pat. No. 3,791,847.

[30] Foreign Application Priority Data
Dec. 22, 1972 France .................. 72.46028

[52] U.S. Cl. .................. 427/226; 427/249; 427/377
[51] Int. Cl.² .................................. B05D 3/02
[58] Field of Search ............. 117/46 CB, 106, 228, 117/DIG. 11, 46 CC, 119.6; 423/299, 423/322, 323, 458, 445

[56] References Cited
UNITED STATES PATENTS

| | | | |
|---|---|---|---|
| 916,905 | 3/1909 | Whitney | 117/46 CC |
| 1,856,756 | 5/1932 | Frigiola | 117/46 CC |
| 1,895,063 | 1/1933 | Zurcher | 208/113 |
| 2,736,642 | 2/1956 | Baker et al. | 51/295 |
| 3,157,541 | 11/1964 | Heywang et al. | 117/106 C |
| 3,335,094 | 8/1967 | Darby | 252/188.3 |
| 3,427,120 | 2/1969 | Shindo et al. | 423/447 |
| 3,512,932 | 5/1970 | Stern et al. | 423/299 |
| 3,652,221 | 3/1972 | Sloka | 423/447 |
| 3,738,352 | 11/1973 | Northway et al. | 117/46 CB |
| 3,791,847 | 2/1974 | Araki et al. | 117/106 R |

*Primary Examiner*—William D. Martin
*Assistant Examiner*—Janyee A. Bell
*Attorney, Agent, or Firm*—Lane, Aitken, Dunner & Ziems

[57] ABSTRACT

A carbon article, such as a fiber, tape or film, is coated, by vapor deposition, with a pyrolysis product containing carbon and phosphorus and is then treated by heating at a temperature above the pryolysis temperature. The carbon source and the phosphorus source may be a single vaporizable compound or may be a mixture of phosphorus-containing vapors and carbon-containing vapors. The preferred carbon source is a polycyclic compound having two or more condensed rings.

10 Claims, No Drawings

OXIDATION RESISTANT COATED CARBON ARTICLES

CROSS-REFERENCE TO RELATED APPLICATION

The present application is a continuation-in-part of U.S. application Ser. No. 166,118, filed July 26, 1971, and now issued as U.S. Pat. No. 3,791,847.

BACKGROUND OF THE INVENTION

This invention relates to a method for the preparation of carbon fibers, films and tapes having excellent mechanical properties, good flexibility and high resistance to oxidation.

Prior art carbon articles in the form of fibers, tapes and film generally have good mechanical strength, but lack flexibility and resistance to oxidation. Consequently, where these prior art carbon articles are used as reinforcing materials in various composite materials, their use in applications requiring flexibility or resistance to oxidation are inevitably limited to a certain extent.

Our co-pending U.S. application, Ser. No. 166,118, filed July 26, 1971, now U.S. Pat. No. 3,791,847 discloses a method for the preparation of oxidation-resistant carbon products by pyrolyzing various hydrocarbons in the presence of a phosphorus compound and depositing the resultant carbon on a shaped substrate of carbon or other material. Where the method of U.S. Ser. No. 166,118 is applied to the preparation of carbon articles such as carbon fibers, tapes, or films the resultant products have excellent mechanical strength and oxidation-resistance, but lack flexibility.

SUMMARY OF THE INVENTION

It has now been discovered that carbon products having improved mechanical strength, oxidation-resistance and flexibility can be obtained by vapor deposition of a pyrolysis product to form a coating containing carbon and phosphorus on a carbon substrate in the form of a fiber, tape, film or the like and then heat-treating the coated article at a temperature above the pyrolysis temperature. The coating may be formed by vapor phase pyrolysis of a vapor mixture containing a carbon source and a phosphorus source. Alternatively, the vapor of a single organic phosphorus compound may serve as both the carbon source and the phosphorus source.

The desired products are advantageously obtained by depositing a coating of pyrolysis products containing carbon and phosphorus in a ratio of 1–20% by weight phosphorus on a carbon substrate so as to cover the surfaces of the carbon substrate, and then thermally treating the resultant article at a temperature of 1,500°–2,000°C.

It is, therefore, an object of the present invention to provide a method for the preparation of carbon articles, particularly carbon fibers, films and tapes suitable for composite reinforcement, having satisfactory flexibility as well as excellent mechanical strength and oxidation-resistance.

The above and other objects and advantages of the present invention will be apparent from the following detailed description.

DESCRIPTION OF THE PREFERRED EMBODIMENTS

As previously mentioned, the method of the present invention involves covering the surface of a carbon substrate with a pyrolized coating containing carbon and phosphorus in a predetermined ratio and then heat-treating the resultant article. The pyrolyzed material of the coating is obtained by pyrolyzing a mixture of a vapor of an organic compound or compounds which produce carbon by pyrolysis, and phosphorus vapor or the vapor of a phosphorus-containing compound, and then thermally treating the resultant coated carbon article at a temperature higher than the pyrolysis temperature.

The vaporizable organic compound which is used in the present invention for producing carbon by pyrolysis may contain oxygen, nitrogen, sulfur or the like and is not limited to hydrocarbons. Examples of suitable carbon sources are organic compounds including aliphatic hydrocarbons such as methane, ethane, hexane and the like; and cyclic hydrocarbons, including both aromatic and alicyclic hydrocarbons, such as benzene, cyclohexane, naphthalene, tetralin, decalin, indene, indane, acenaphthene, fluorene, anthracene, phenanthrene, pyrene, naphthacene, chrysene, triphenylene, perylene and alkyl derivatives thereof. Moreover, various kinds of olefins may be used, including ethylene, propylene, butylene, pentadiene, and the like. Additionally, compounds having a heterocyclic ring may also be used, including nitrogen-containing compounds such as indole, quinoline, carbazole, phenanthrazine or the like; sulfur-containing compounds such as thionaphthene, thiophenol, diphenylene sulfide and the like; and alkyl derivatives of these heterocyclic compounds. Furthermore, the above-mentioned compounds may be partially substituted with an amino group or a hydroxide group and serve as a suitable carbon source.

In addition to the above-mentioned compounds, a petroleum fraction containing a large amount of cyclic compounds may be used as the carbon source. Suitable fractions include a crude petroleum fractionated at a temperature higher than 200°C, residual oils secondarily produced in petroleum refining industries such as visbreaker residual oils, coker residual oils, reduced pressure distillation residual oils, catalytically cracked recycle oils, dealkylation residual oils, and the like. Furthermore, there may be used a variety of residual oils which are obtained in petro chemical processes which include, for example, bottom oil obtained in the preparation of ethylene from p. naphtha thermal cracking, by-product tar from the preparation of ethylene-acetylene, by-produce oil tar produced in the gastification of petroleum or coal, and coal tar obtained in the dry distillation of coal.

The preferred carbon sources, from the viewpoint of reaction velocity and carbon yield, are the aromatic compounds and particularly those compounds which have a polycyclic structure of more than two rings and which have a vapor pressure higher than 5 mmHg at 490°C.

The phosphorus or a phosphorus compound which is mixed with the carbon source starting material should be vaporizable, but has no other limitatons.

The phosphorus source may be molecular phosphorus such as yellow phosphorus or red phosphorus. Suitable inorganic phosphorus compounds include phosphorus hydrides such as phosphine, diphosphine, and the like; phosphorus oxides such as diphosphorus trioxide, phosphorus suboxide, and the like; phosphoric acid and phosphorus sulfide; chlorine compounds such as phosphorus trichloride, phosphorus pentachloride, thiophosphonyl trichloride, and the like; and halogenated phosphonitrile compounds. Suitable organic phosphorus compounds include primary, secondary and tertiary phosphines, halophosphines, phosphonyl halides, thiophosphonyl halides, phosphonium compounds, alkylphosphates and alkyl phosphites.

Phosphorus-containing organic compounds having an aromatic structure such as triphenylphosphine and triphenylphosphate may be used alone, without a separate carbon source since they also serve as a suitable carbon source.

The mixture of the carbon-producing organic compound or compounds (carbon source) and phosphorus or a phosphorus compound (phosphorus source) are mixed in a predetermined ratio. In general, the amount of phosphorus or the phosphorus compound is within a range of 1–20% by weight of the carbon source, and the concentration of the phosphorus or phosphorus compound within that range is varied according to the nature of the reactants and article desired. The mixture may be pyrolyzed in accordance with the method of U.S. application Ser. No. 166,118, filed July 26, 1971, the teachings of which are hereby incorporated by reference, i.e., the mixture of carbon and phosphorus sources may be pyrolyzed at a temperature of 600° to 1500°C with or without the addition of an inert gas. In order to satisfactorily control the pyrolysis reaction, the pyrolysis reaction mixture should be diluted with a predetermined amount of an inert gas. Alternatively, a reduced pressure may be employed to control the reaction. It is preferred that the final product have a total cross-sectional area 2–20 times as large as that of the initial carbon article before deposition, although the amount of the coating may be varied depending upon the particular cross-sectional shape and thickness of the carbon substrate and the end purpose intended for the product.

In accordance with the present invention, the carbon articles coated by vapor deposition in the manner described above are thermally treated at a temperature of 1500°–2000°C for a period of 0.2 second to 30 minutes. The thermal treatment is preferably conducted in a non-oxidizing atmosphere. The heating may be either direct or indirect.

The resultant carbon articles, coated and treated as described above, have improved mechanical strength and increased flexibility, as compared to similar prior art articles. The bending radius of the carbon articles obtained in accordance with the present invention is reduced by about 30% and the mechanical strength is increased by 10–40% as compared to conventionally treated carbon articles. The degree to which these physical properties are improved depends upon not only the thermal treating conditions, but also on the cross-sectional shape of the article, on the thickness of the pyrolytically deposited layer, and on the composition of the reactant gases. The reasons why the carbon articles of the present invention have such improved properties are presently unknown. However, it is believed that these improvements are at least partially due to phosphorus in the deposited layer inhibiting the crystalline growth of the carbon, thus allowing increased bonding force between crystals. If the thermal treating temperature of the pyrolytic product-coated carbon articles is higher than 2000°C, phosphorus contained in the deposited layer is released, so that great structural deformation occurs in the deposited layer and results in a reduction in mechanical strength. On the other hand, where the treating temperature is lower than 1500°C, there is insufficient difference between the treating temperature and the pyrolytic deposition temperature to produce the desired improvement in the bonding forces between the crystals of the carbon articles.

The carbon products of the present invention in the form of tapes or films have excellent oxidation-resistance, mechanical properties and satisfactory flexibility. Thus, the carbon articles of the present invention can be used as reinforcing materials in various composite materials.

The following examples are intended to be illustrative only, and are not intended to limit the scope of the present invention as defined by the appended claims.

Example 1

A residual oil which was obtained by the tubular type cracking of petroleum naphtha was thermally cracked at 1200°C to obtain a tar fraction having a boiling point of 430°–450°C. 10% by volume of triphenyl phosphine was mixed with that tar fraction and the mixture was pre-heated to 450°C to gasify same. The gaseous mixture was then diluted with nitrogen gas to about 1% by volume (based on the resultant mixture) and fed into a vertical type pyrolyzing furnace at a rate of 2 liters/min. In the pyrolyzing furnace, carbon fibers (having a diameter of $28\mu$ and a strength of 5 T/cm²) with a carbon content higher than 98% by weight, were thermally treated at about 1000°C, and then maintained in a nitrogen atmosphere while heating to 900°C by electric current. The vapor products resulting from pyrolysis of the gaseous reactants deposited on the surfaces of the carbon fiber increased the diameter of the carbon fiber to $90\mu$. The thus coated carbon fibers were divided into three test samples and were thermally treated in an indirect heating furnace, an argon atmosphere, for 12 seconds at 1600°C, 1730°C and 1960°C, respectively. The properties of the three differently treated carbon fiber samples are shown in Table 1. When the above carbon fiber samples, designated B, C and D in the Table, were heated in air for 120 minutes in an indirect heating furnace at 750°C to determine oxidation resistance, the weight changes were so small as to be undetectable, thus indicating excellent oxidation-resistance. The phosphorus content of the deposited layers of the carbon fibers was about 14% by weight for all samples.

As is apparent from Table 1, the carbon fiber samples B, C and D also have greater mechanical strength as compared to the starting material A.

Table 1

| | Sample | Treating Temperature °C | Strength T/cm² | Elongation at break % | Radius of Curvature mm |
|---|---|---|---|---|---|
| Comparative Example | A | — | 20 | 0.6 | 4.8 |
| Examples of the Invention | B | 1600 | 38 | 1.2 | |
| | C | 1730 | 42 | 1.3 | |
| | D | 1960 | 35 | 1.2 | 2.3 |

EXAMPLE 2

An oil having a high aromatics content, obtained by thermal cracking Minas crude petroleum at about 2000°C for 1/1000 seconds with steam, was subjected to hydrogenation and desulfurization treatments to yield a partially hydrogenated oil having a boiling point of 280°–420°C. 10% by volume of trimethyl phosphine was mixed with the partially hydrogenated oil, and the mixture was vaporized. The vaporized mixture was diluted with a pre-heated nitrogen gas to about 5% by volume. In an indirect heating furnace preheated to 400°C, were placed high strength carbon fibers (having a diameter of 19$\mu$ and a strength of 24 T/cm$^2$) which had a carbon content higher than 98% by weight and which had been previously treated at about 1300°C. The fibers were heated to 1150°C. The above described diluted vapor mixture was introduced into the furnace for the purpose of depositing phosphorus-containing carbon upon the surfaces of the carbon fibers. The vapor deposition was continued until the diameter of the carbon fibers reached about 26$\mu$. The phosphorus content of the deposited layer was 9.6% by weight.

The above process was then repeated except that the percentage of the phosphorus compound in the vapor mixture was varied as indicated in Table 2.

All samples were subjected to thermal treatment at 1700°C for 2 minutes in a nitrogen atmosphere. The properties of the thus treated different carbon fiber samples are shown in Table 2. It is clear from the Table that the deposited layers having a phosphorus content of 1–20% by weight show the greatest strength.

Table 2

| | Sample | Phosphorus Content % by weight | Strength T/cm$^2$ |
|---|---|---|---|
| Comparative Example | A | 0.2 | 19 |
| Example of the Invention | B | 1.1 | 26 |
| | C | 4.3 | 36 |
| | D | 9.6 | 51 |
| | E | 15.0 | 44 |
| | F | 19.6 | 34 |

These carbon fiber samples were then subjected to oxidation-resistance tests, as in Example 1. No reduction in weight was observed for any of the samples as a result of the oxidation-resistance tests.

The carbon fibers used as a substrate to prepare the above were of the type described in Japanese Pat. application No. 29785/1971, the surfaces of which were smoothed by continuously passing them through an electrodeless discharge type plasma torch which used argon gas.

EXAMPLE 2

An antheracene oil fraction, obtained by dry distillation of coal, was mixed with 20% by volume methyl formate. The mixture was pre-heated to 380°C to vaporize same, which vapor was in turn diluted with methane gas to 2.5% by volume. The thus diluted gases were introduced into a vertical type tubular indirectlyheated furnace through four inlets in each of two facing inner side walls of the furnace at a velocity of 3.8 liters/min. The furnace was pre-heated to 400°C. Carbon tapes having a width of 2 mm and a thickness of 5$\mu$ (which had been treated at 1000°C, and having a carbon content higher than 99% by weight and a strength of 2T/cm$^2$) were placed in the furnace and maintained at about 1500°C by means of an electric current passed therethrough.

The furnace was arranged in such a manner that the gases were introduced at right angles with respect to the carbon tapes, and fresh mixed gases were continuously passed over the surfaces of the carbon tapes. In this manner, pyrolytic products were deposited upon the surfaces of the tapes until the thickness of the tapes reached about 20$\mu$. Thereafter, the coated tapes were thermally treated at about 1800°C for 30 minutes in an argon atmosphere. The resultant tapes had a strength of 22 T/cm$^2$, a breaking elongation of 1.1% and a radius of curvature (when bended along the tape surface) of about 1.4 mm. By the thermal treatment, the mechanical strength was increased by 20%, the elongation by 40%, and the minimim radius of curvature was reduced by about 30%. The phosphorus content of the deposition layer was about 3% by weight. The tape product showed an excellent oxidation-resistance when tested in a manner similar to Example 1.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A process for producing a phosphorus-containing carbon coating on a carbon substrate comprising:
   vaporizing a phosphorus-containing organic compound or a mixture of a phosphorous compound and an organic compound, said organic or phosphorus-containing organic compound capable of undergoing vapor phase pyrolysis to form a first atmosphere;
   heating the substrate in said first atmosphere to a first temperature of 600° to 1,500°C so as to effect vapor phase pyrolysis of said organic compound or phosphorus-containing organic compound, thereby forming a carbon coating on said substrate containing 1–20% by weight of phosphorus; and
   heating said coated carbon article in a second nonoxidizing atmosphere at a second temperature of 1,500° to 2,000°C for 0.2 seconds to 30 minutes, said second temperature being higher than said first temperature.

2. The process of claim 1 wherein said organic compound has at least two condensed aromatic rings and a vapor pressure higher than 5 mm Hg at 490°C.

3. The product formed by the process of claim 1.

4. The process of claim 1, wherein the carbon substrate is in the form of a tape, film or fiber.

5. The process of claim 1, wherein said heating at a temperature of 1,500° to 2,000°C is effected by direct-heating.

6. The process of claim 1, wherein said heating at a temperature of 1,500° to 2,000°C is effected by indirect-heating.

7. A process for the production of a phosphorus-containing carbon coating on a carbon substrate comprising:
   vaporizing a polycyclic phosphorus-containing compound or a mixture of phosporus or a phosphorous compound and a polycyclic organic compound to form a first atmospher;

heating the substrate to a first temperature of 600°–1500°C in said first atmosphere to effect pyrolysis of said organic compound or phosphorus-containing compound coming into contact with the substrate, thereby forming a coated carbon article; and heating said coated carbon article in a non-oxidizing second atmosphere at a second temperature of 1500°–2000°C for 0.2 seconds to 30 minutes, said second temperature being higher than said first temperature.

8. The process of claim 7 wherein said polycyclic organic compound is selected from naphthalene, tetralin, decalin, indene, indane, acenaphthene, fluorene, anthracene, phenanthrene, pyrene, naphthacene, chrysene, triphenylene, perylene, alkyl derivatives thereof and mixtures thereof.

9. The process of claim 7 wherein said polycyclic phosphorus-containing compound is selected from triphenylphosphine and triphenylphosphate.

10. The process of claim 7 wherein said vapor is diluted with an inert gas prior to pyrolysis.

* * * * *

UNITED STATES PATENT OFFICE
CERTIFICATE OF CORRECTION

Patent No. 3,912,832          Dated October 14, 1975

Inventor(s) Tadashi Araki and Kiro Asano

It is certified that error appears in the above-identified patent and that said Letters Patent are hereby corrected as shown below:

IN THE SPECIFICATION:

Column 2, line 49, "by-produce" should read --by-product--.

In Table 1, Sample B, under the column "Radius of Curvature mm" should read --2.5--;

Sample C, under the column "Radius of Curvature mm" should read --2.2--.

Column 5, line 55, "EXAMPLE 2" should read --EXAMPLE 3--.

Column 7, line 2, "atmospher" should read --atmosphere--.

Signed and Sealed this twenty-third Day of March 1976

[SEAL]

Attest:

RUTH C. MASON
*Attesting Officer*

C. MARSHALL DANN
*Commissioner of Patents and Trademarks*